United States Patent
Ruscio et al.

(10) Patent No.: US 6,555,029 B1
(45) Date of Patent: Apr. 29, 2003

(54) ARBOR FOR LATHING A LENS

(75) Inventors: Dominic V. Ruscio, Webster, NY (US);
Richard J. Wrue, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 352 days.

(21) Appl. No.: 09/605,797

(22) Filed: Jun. 27, 2000

(51) Int. Cl.⁷ .............................................. B29D 11/00
(52) U.S. Cl. ........................... 264/1.1; 264/2.5; 264/2.7; 425/808; 451/42
(58) Field of Search ........................... 264/2.5, 2.7, 1.1; 425/808; 451/42, 240, 255, 256

(56) References Cited

U.S. PATENT DOCUMENTS

| | | | |
|---|---|---|---|
| 3,773,868 A | * 11/1973 | Bronstein | |
| 4,239,712 A | * 12/1980 | Neefe | 264/2.2 |
| 4,478,770 A | * 10/1984 | Vofsi et al. | 264/2.7 |
| 4,749,530 A | * 6/1988 | Kunzler | 264/2.7 |
| 4,921,205 A | 5/1990 | Drew, Jr. et al. | 249/61 |
| 5,110,278 A | 5/1992 | Tait et al. | 425/175 |
| 5,137,441 A | * 8/1992 | Fogarty | 264/2.7 |
| 5,794,498 A | 8/1998 | Chaloux | 82/1.11 |
| 5,931,068 A | 8/1999 | Council, Jr. et al. | 82/1.11 |
| 5,972,251 A | * 10/1999 | Shannon | 264/2.7 |

FOREIGN PATENT DOCUMENTS

EP 143253 * 6/1985

* cited by examiner

Primary Examiner—Mathieu D. Vargot
(74) Attorney, Agent, or Firm—John E. Thomas

(57) ABSTRACT

An arbor for lathe cutting lenses, especially contact lenses, from a blank, is designed for the mounting of a lens mold with a cast lens blank therein during lathing of the lens blank. The arbor is made in a manner to ensure the lens mold is axially aligned with the arbor. The arbor can be reused for lathe cutting of multiple lens blanks retained in their respective lens molds.

12 Claims, 4 Drawing Sheets

ARBOR FOR LATHING A LENS

BACKGROUND OF THE INVENTION

The present invention relates to an arbor for lathe cutting lenses, especially contact lenses, from a blank or button, and a method and apparatus for making the arbor.

A conventional method of manufacturing lenses, especially contact lenses, involves lathing the lens from a cylindrical blank of polymerized lens material (such cylindrical blanks commonly referred to as a "button"). The buttons may be cut initially from rod stock or sheets, or individually cast in cups using a curable liquid monomeric composition. Additionally, lenses may be lathe cut from a semi-finished lens blank, i.e., a blank having one molded-in lens surface, where the opposite lens surface is lathed to obtain a second desired lens surface and an article with a final contact lens shape.

While it is possible in some cases to insert the lens blank directly into the lathe collet, it is more typical to first attach the button to a separate pin or "block" with an adhesive, the opposite end of the block being configured for removable insertion into the collet of the lathe. While the block and button are turned, the desired concave or convex curve is lathed into the exposed end of the blank. Eventually, the lathed article must be separated from the block (a process often referred to as "deblocking"). However, a drawback of such lathe cutting operations is that the blocking and deblocking steps may consume a significant amount of time and are prone to error, especially when it is necessary to maintain axial alignment between the block and the article being lathe cut.

U.S. Pat. No. 4,921,205 discloses a process where a semi-finished blank is cast between a plastic mold cup and a radial die, for example, the radial die may form a finished concave lens surface. The radial die is removed, with the cast blank remaining adhered to the mold cup. The mold cup and blank assembly may be shipped to a lab for manufacture of a contact lens, by first machining the mold cup off the blank, then machining away the extraneous portion of the blank to form the second, opposite lens surface. Presumably, the cast surface of the blank would be adhered to a block for these machining operations, similar to other conventional methods for lathe cutting a lens surface from a semi-finished blank.

U.S. Pat. No. 5,110,278 discloses a process for producing toric contact lenses. A semi-finished blank is cast in an arbor having a cup-shaped top portion. The arbor also includes a hollow bottom portion integrally formed as a one-piece molding with the top portion. This hollow bottom portion is mounted on a lathe spud, for lathe cutting the exposed front surface of the semi-finished blank retained in the cup-shaped top portion. Each arbor is injection molded, and the arbors are not reusable since the lathing operation involves simultaneous cutting of the lens blank and sidewalls of the casting cup top portion.

SUMMARY OF THE INVENTION

The present invention provides an arbor for lathe cutting lenses, especially contact lenses, from a blank or button, and a method and apparatus for making the arbor. The arbor is designed for the mounting of a lens mold with a cast lens blank therein during lathing of the lens blank, and the arbor is made in a manner to ensure the lens mold is axially aligned with the arbor. The arbor can be reused for lathe cutting of multiple lens blanks retained in their respective lens molds.

According to a first embodiment, this invention provides a method for making an arbor comprising: providing a lens mold that includes a lens-forming molding surface and an opposed non-molding surface, and placing a hardenable material (for example, liquid or pliable solid material) between the opposed surface of the lens mold and an end of an arbor; moving the lens mold and the arbor towards one another while maintaining axial alignment therebetween, whereby the hardenable material is pressed between and contacts a surface of the lens mold and a surface of the arbor end and conforms to said surfaces; hardening the material to form a hardened replica of the lens mold surface contacted by said material; and separating the arbor with the hardened material attached thereto from the lens mold. The arbor may be placed on a lathe collet, a second contact lens mold including a lens blank cast therein may be secured to the hardened material of the arbor, and a desired lens surface may be lathe cut in the lens blank. This same hardened material of the arbor may be used repeatedly to lathe cut a desired lens surface in multiple lens blanks retained in their respective lens molds.

According to preferred embodiments, the central axis of the lens mold is congruent with the central axis of the arbor when said material conforms to the lens mold and arbor end surfaces. Also, the lens mold may be secured in a first fixture to inhibit axial movement thereof, and the arbor may be secured in a second fixture to inhibit axial movement thereof. These first and second fixtures may include complementary tapered surfaces for maintaining axial alignment of the lens mold and arbor secured thereon. The first and second fixtures may include a bore for securing the lens mold and arbor, respectively.

According to other preferred embodiments, the lens mold includes a sidewall depending from the opposed, non-molding surface, such that the hardenable material contacts and conforms to an inner surface of the sidewall, and wherein the arbor end is received in a space surrounded by the sidewall. At least a portion of the sidewall inner surface is preferably noncylindrical.

According to a second embodiment, this invention provides a method comprising: casting a lens blank in a lens mold; securing the lens mold with the blank on an arbor end, the arbor end including a replica of an inner surface of the lens mold; and lathe cutting a lens surface in the blank.

According to other embodiments, the invention provides an arbor comprising a first end for mounting on a lathe collet and an opposed second end, and a hardened material surrounding and adhered to the second arbor end, the hardened material having an outer surface that is a replica of an inner surface of a contact lens mold.

DETAILED DESCRIPTION OF VARIOUS PREFERRED EMBODIMENTS

Figure 1:
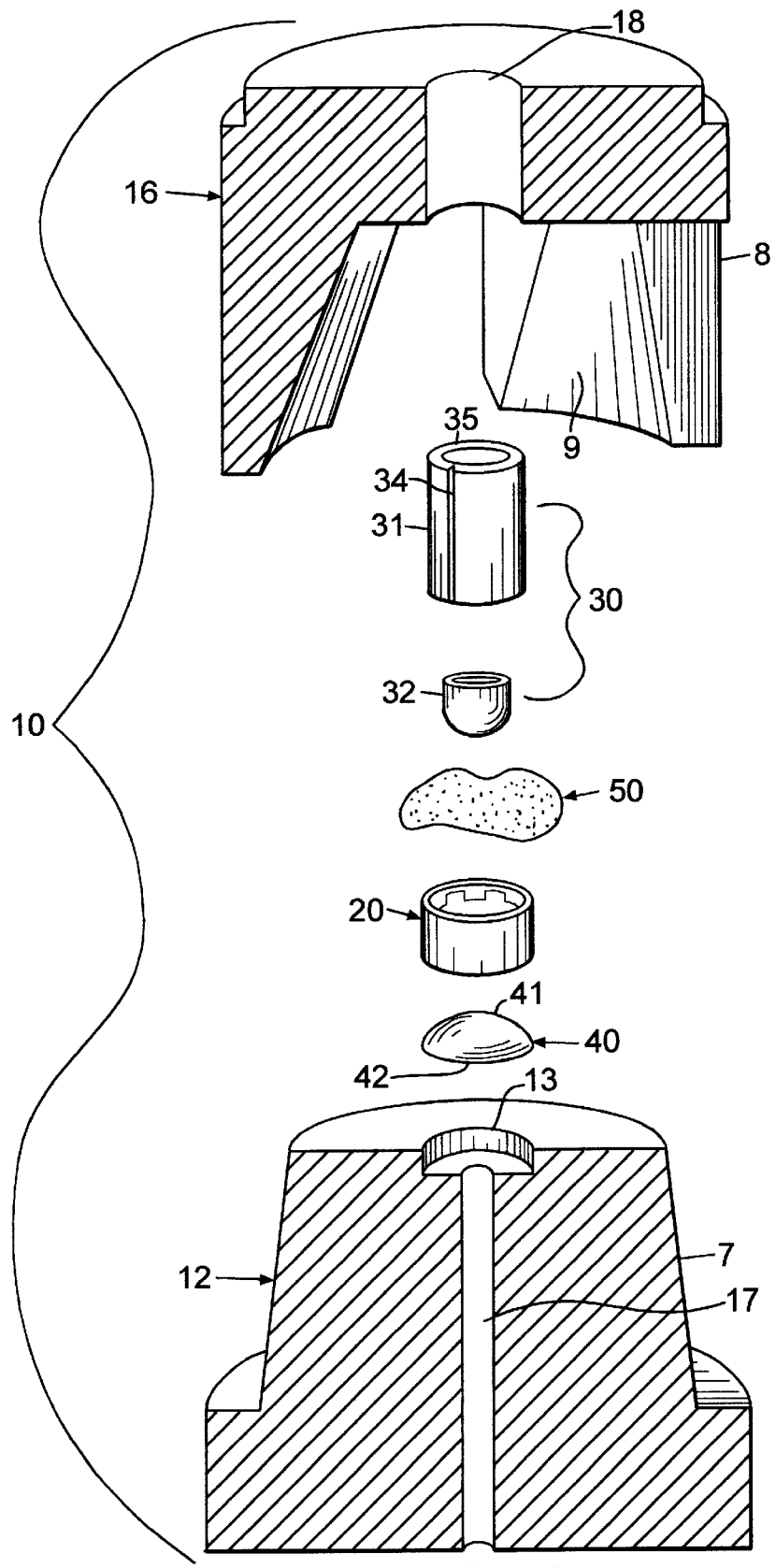
FIG. 1 is an exploded perspective view of an assembly for making an arbor according to various preferred embodiments of this invention.
Figure 2:
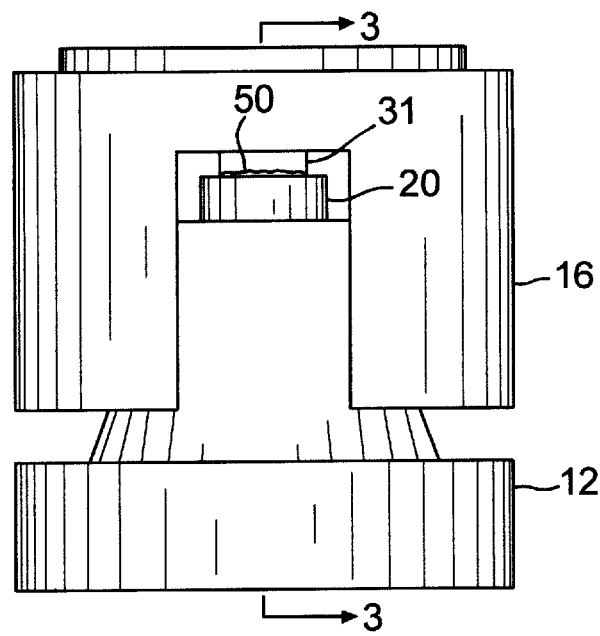
FIG. 2 is a side view of the assembly of FIG. 1.
Figure 3:
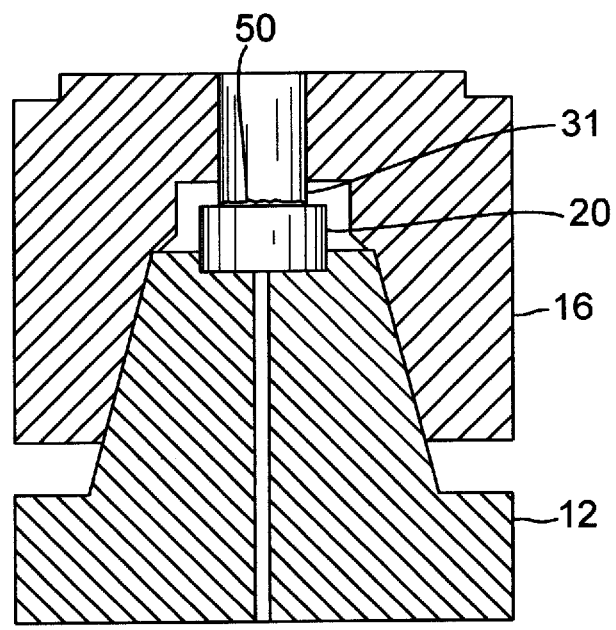
FIG. 3 is a side, cross-sectional view of the assembly, taken along line 3—3 of FIG. 2.

FIGS. 1 to 3 illustrate an assembly for preparing an arbor according to various preferred embodiments of this invention. The assembly 10 includes a first fixture 12 for supporting lens mold 20, and a second fixture 16 for supporting the body (or shaft) 31 of arbor 30. For this preparation of the arbor, a lens blank 40 may be retained in lens mold 20; alternately, a lens mold 20 that does not include a lens blank may be employed for the arbor preparation process.

Figure 4:
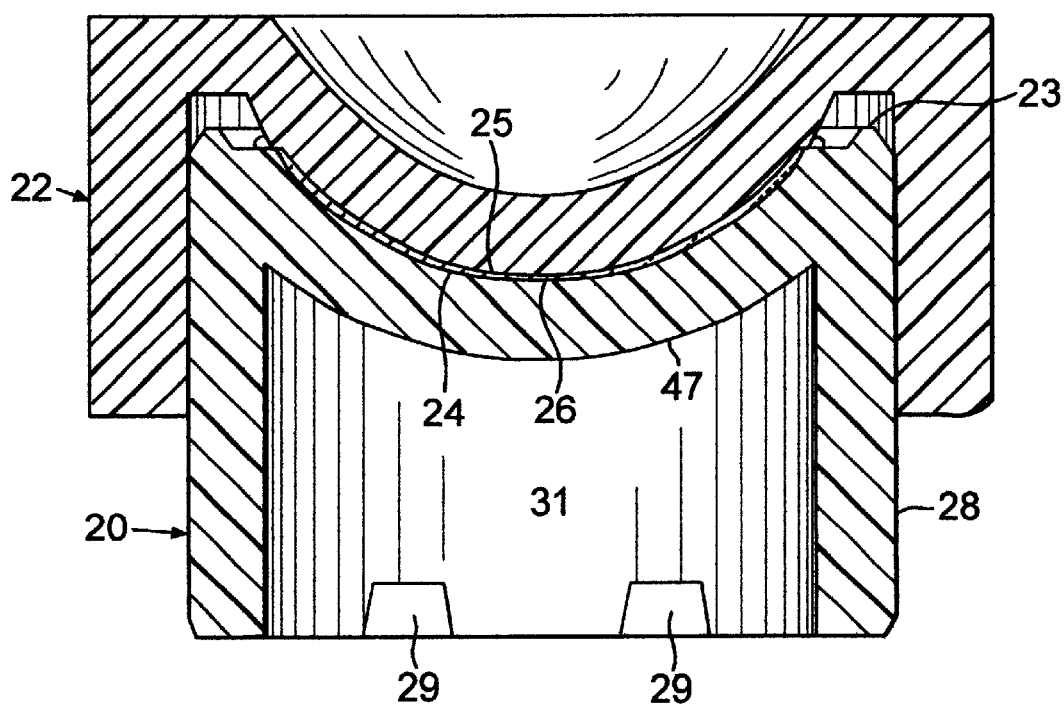
FIG. 4 is a side, cross-sectional view of a lens mold assembly including the lens mold in the assembly of FIG. 1.
Figure 5:
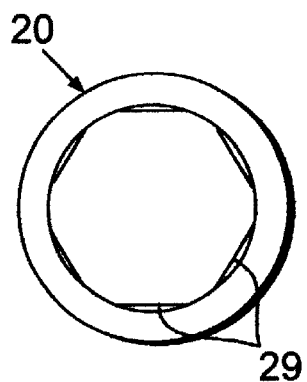
FIG. 5 is a bottom plan view of the lens mold of FIG. 4.

A preferred configuration of the lens mold 20 is shown in FIGS. 4 and 5. In FIG. 4, lens mold 20 includes a molding surface 24 for forming an anterior (front) lens surface 41 on lens blank 40. For the described embodiment, lens mold 20 is paired with a second mold part 22 that includes a molding surface 25 for forming the surface 42 on lens blank 40 that is opposed to its anterior lens surface 41. Specifically, lens blank 40 is cast in the cavity 26 formed between molding surfaces 24 and 25. According to conventional static cast molding methods, a polymerizable monomer mixture is deposited on molding surface 24, and second mold part 22 is mated with lens mold 20 to assume the general configuration shown in FIG. 4. Then, the monomer mixture is polymerized in cavity 26, for example, by exposure to light and/or heat, to obtain a lens blank 40. It is intended that lens blank 40 has a greater thickness than ultimately desired, i.e., surface 42 of lens blank will be lathe cut in subsequent operations.

For the described embodiment, lens mold 20 includes a non-molding surface 27 opposed to its molding surface 24. Also, a depending sidewall extends from surface 27, which in the illustrated embodiment has the form of a generally cylindrical shell 28 depending from the non-molding surface 27. By "generally cylindrical", it is meant that shell 28 may deviate slightly from a cylindrical shape, for example, shell 28 may be tapered to form a frustoconical shell. Also, as best seen in FIG. 5, the lens mold 20 of the described embodiment includes facets 29 at a lower portion of the inner surface of shell 28, so that this lower portion inner surface is non-cylindrical. Various alternate embodiments are within the scope of this invention. For example, a cylindrical button may be cast between the two mold parts, although this would require ultimately lathe cutting both surfaces of the button. Also, the lens blank 40 may be formed by conventional spincasting techniques in a lens mold 20.

Figure 6:
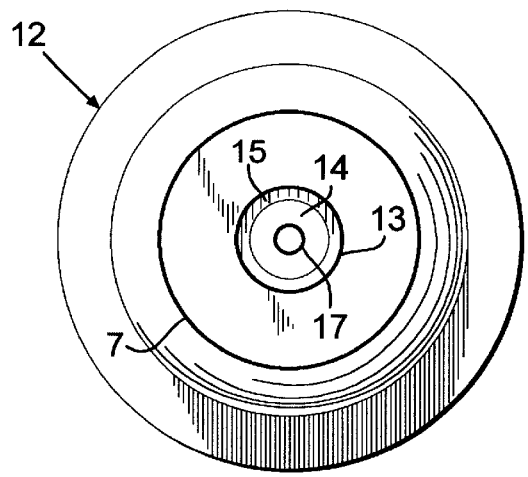
FIG. 6 is a top plan view of the first fixture in the assembly of FIG. 1.
Figure 7:
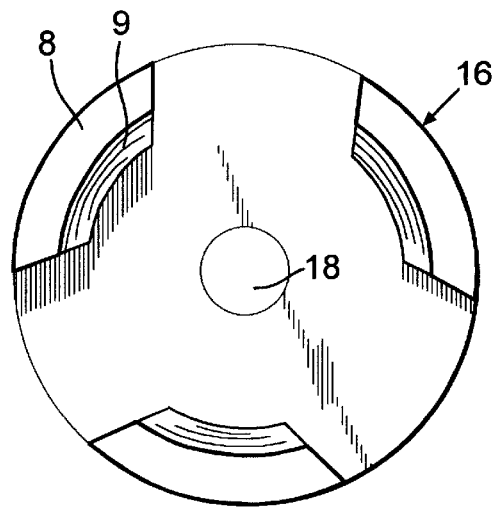
FIG. 7 is a bottom plan view of the second fixture in the assembly of FIG. 1.

As previously mentioned, the lens mold 20 is supported in first fixture 12. Specifically, for the described embodiment, the upper portion of first fixture 12 includes a cavity 13, the inner circumference of which closely approximates the outer diameter of the upper section of shell 28 received therein. It is noted that when the lens mold 20 is inserted in cavity 13, it is inverted from the position shown in FIG. 4. As best seen in FIG. 6, cavity 13 terminates in a floor surface 14, and in the described embodiment, floor surface 14 includes a circumferential recessed groove 15. Accordingly, when lens mold 20 is inserted in cavity 13, shoulder 23 of lens mold 20 rests against floor surface 14; specifically, for the described embodiment, shoulder 23 rests in groove 15. The primary purpose of first fixture 12 is to secure lens mold 20 in a predetermined axial position, and to prevent axial tilt of the lens mold, during subsequent operations. First fixture 12 should be constructed of a rigid material, for example, a corrosion-resistant metal such as aluminum or stainless steel. Finally, it is noted that the described first fixture 12 includes a through-hole (or bore) 17 to facilitate subsequent removal of the lens mold 20 from cavity 13.

The end 35 of arbor 30 is inserted in the through-hole (or bore) 18 of the second fixture 16. Through-hole 18 has an inner circumference that closely approximates the outer diameter of body 31. For example, arbor body 31 should fit snugly in through-hole 18 yet be slideable therein. The primary purpose of second fixture 16 is to secure lens arbor 30 in a predetermined axial position, and to prevent axial tilt of the arbor 20, during subsequent operations. Second fixture 16 should be constructed of a rigid material, for example, a corrosion-resistant metal such as aluminum or stainless steel. For the described embodiment, arbor 30 includes the body portion 31 and a head portion 32 having the form of a pin inserted in the body portion with a tight fit. However, other configurations are within the scope of this invention, the main consideration being that the arbor includes a body portion for mounting in a lathe during subsequent lathe cutting operations, such as the shaft configuration shown for the illustrated embodiment. While lens mold 20 is secured in cavity 13, a hardenable material 50 is inserted in cavity 21 formed between surface 27 and the inner surfaces of shell 28. Hardenable material 50 may have the initial form of a liquid or a pliable solid, and this material is hardenable to form a rigid, hardened solid. Representative materials include: two-part epoxy compositions, that are initially liquid and upon mixing cure to form a hard solid; a photocurable cement or adhesive, that are initially liquid and cure upon exposure to radiant energy to form a hard solid; and various waxes, that are a pliable solid at higher temperatures and harden upon lowering of temperature. Generally, the material preferably exhibits minimal shrinkage when hardened.

Next, second fixture 16, with arbor 30 received in through-hole 18, is lowered on first fixture 12, with the lens mold 20 secured in cavity 13 and the hardenable material in space 21, while the first fixture 12 is supported on a support surface. Compressive force may be applied to the second fixture if necessary to ensure that the second fixture is completely lowered on the first fixture. For the described embodiment, first fixture 12 has an outer tapered surface 7, in the form of a frustoconical surface, and second fixture 16 has sidewalls 8 the inner surfaces 9 of which have a complementary taper, to facilitate guiding and alignment of the two fixtures. Other configurations of these two fixtures are possible, the main consideration being that first fixture 12 has a predetermined axial alignment with the second fixture 16, thereby ensuring that the arbor 30 and lens mold 20 secured in these fixtures have the desired axial alignment relative to one another. For example, for the described embodiment, at this point in the process the central longitudinal axis of body 31 will typically be congruent with the central axis of lens mold 20.

Now that the arbor and lens mold are aligned axially, a compressive force is placed on end 35 of the arbor body, so that the arbor body slides through through-hole 18 and the head 32 approaches, but does not contact, surface 27 of lens mold 20. For example, arbor body 31 is slid through through-hole 18 until end 35 is flush with the surface surrounding through-hole 18, and the assembly assumes the configuration shown in FIG. 2. This operation results in the hardenable material being pressed between surface 27 and head 32, so that the hardenable material 50 contacts surface 27 and head 32, and conforms to said surfaces. Additionally, it is noted that head portion 32 and the adjacent end portion 57 of the body portion that are received in space 21 of lens mold 20 have smaller diameters than the inner diameter of shell 28, in other words, there is a clearance between these portions of the arbor and lens mold. The hardenable material conforms to fill this clearance, also. By routinely experimenting with different amounts of hardenable material 50 and various positions of the arbor and lens mold, one can determine what appropriate volume of hardenable material will fill the desired void between the arbor and the lens mold. As seen in FIG. 2, it is possible for a small amount of the hardenable material 50 to extend beyond shell 28.

Material 50 is then hardened while the assembly is maintained in the general configuration of FIG. 2. The resultant hardened material is adhered to the head 32 of arbor 30 and has the form of a rigid, hardened replica of the lens mold surfaces in space 21.

Figure 8:
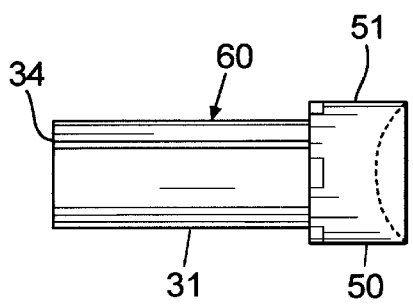
FIG. 8 is a side view of an arbor resulting from the assembly of FIGS. 1 and 2.

Then, the fixtures 12 and 16 are separated so as to recover the resultant arbor 60, shown in FIG. 8, and the lens mold 20. According to a first scenario, it is possible that upon lifting second fixture 16, the lens mold 20 will be retained in cavity 13 while arbor 30 will be retained in through-hole 18. In this case, a push-rod can be inserted through the bottom of bore 17 to remove the lens mold from cavity 13, and this lens mold can be discarded. The arbor 60 including the hardened material 50 adhered thereon can be slid out of through-hole 18 and retained for further operations. According to a second scenario, it is possible that the lens mold 20 and arbor 30 will remain adhered to one another by the hardened material 50. In this case, the second fixture 16 is lifted, whereby the arbor slides through through-hole 18 and is retained with the lens mold. The pushrod can be inserted through the bottom of bore 17 to remove this assembly. Then, the arbor and lens mold can be separated, for example, by clamping each part and applying a separating force. Once separated, the lens mold 20 may be discarded, and the arbor 60 including the hardened replica material 50 adhered thereon is retained for further operations. In either scenario, the recovered, resultant arbor article 60 has the general configuration shown in FIG. 8 for the illustrated embodiment.

It will be appreciated that it is important that the material 50, once hardened, has stronger affinity for the arbor than the lens mold, so that the hardened material is adhered to the arbor rather than the mold. Several factors contribute to the selective affinity of the hardened material. First, the lens mold 20 and arbor 30 may be made of different materials, such that the hardened material has greater selective affinity to the material used for arbor 30. Examples of suitable materials for lens mold 20 are: polyolefins, such as polypropylene, polyethylene, polystyrene, and (co)polymers of cyclic olefins; polyvinylchloride; and the like. Examples of suitable materials for arbor 30 are polycarbonates and polyacrylics, such as polymethylmethacrylate. Second, the shapes and textures of the arbor and mold will affect the affinity of the hardened material thereto. For example, the provision of the pin-shaped head 32 of the arbor helps contribute to the increased affinity of the hardened material thereto. As another example, if necessary, the arbor portion to which the hardened material is adhered may be scored, grooved (such as slot 34 in the described embodiment) or otherwise provided with a roughened texture to increase affinity of the hardened material thereto.

Figure 9:
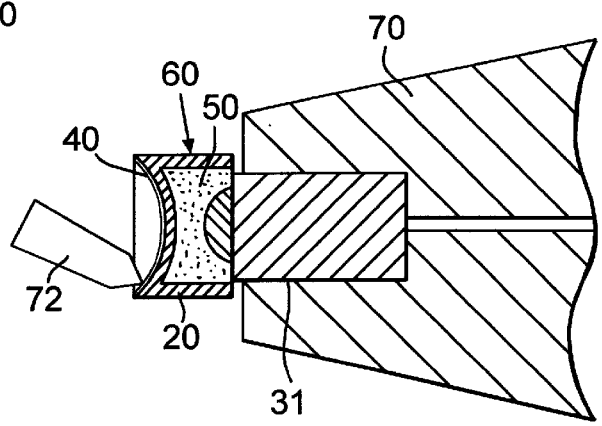
FIG. 9 is a side cross-sectional view of the arbor of FIG. 8 mounted in a lathe collet, with a lens mold and lens blank mounted on the arbor.

The shaft 31 of the resultant arbor article 60 may now be mounted in lathe collet 70, as shown in FIG. 9. Individual lens molds 20, each including a lens blank 40 cast and retained therein, may be mounted on the hardened replica material 50 of arbor 60, and then a lens surface is lathe cut in blank 40 via cutting tool 72. For the illustrated embodiment, the cut lens surface is a concave, base curve surface, although it is within the scope this invention for this lathing operation to involving cutting the convex, front curve lens surface, for example, when the lens blank has a cast concave, base curve surface. While the lens blank and lens mold are mounted in the lathe collet, additional cuts can be made to blank 40. For example, if desired, the periphery of the blank can be cut by also removing material from the lens mold with the cutting tool 72.

It is intended that the same arbor article 60, mounted in lathe collet 70, is used to lathe cut multiple lens blanks cast in similar molds. For example, the arbor article may be used for mounting a series of lens molds and lens blanks obtained from the same casting operation lot. If a different series or lot of lens blanks are cast in molds with differently sized or shaped lower portions (i.e., the lower portion of the lens mold that is mounted on hardened material 50), then it is necessary to form a new arbor article 60 having a hardened replica 50 corresponding to this series of lens molds. For example, it may be desirable to provide an arbor for each unique lens mold injection molding cavity in the case where the lens molds are injection molded in a multi-cavity apparatus and variability occurs among the cavities.

As previously mentioned, the inner surface of the lens mold sidewall 28 (i.e., the surface from which forms the sides 51 of hardened material 50) is preferably non-cylindrical. For the described embodiment in FIG. 5, the lens mold 20 has facets 29 formed in the inner surface of sidewall 28. These facets are transferred to the hardened material 50 of the arbor article when the replica of the lens mold is made, and when lens molds are mounted on the arbor article 60, these facets serve to prevent rotation (or slippage) between the arbor 60 and the lens mold 20 mounted thereon. These facets are also useful for ensuring consistent rotational orientation, for example, to ensure each lens mold is mounted on the same arbor in the same orientation. Other configurations of the lens mold sidewall inner surface are possible. For example, this inner surface may be polygonal or oval in shape.

It is noted that shaft portion 31 of the arbor article 60 may include a longitudinal slot 34 in its outer surface, for alignment with a lathe collet during the lathing operations. For example, in the case that a rotationally asymmetric surface (such as a toric surface) or a surface offset from the center of the lens blank is being cut, collet 70 can be designed to receive alignment slot 34 of shaft portion 31. Thus, slot 31 may be used to register the rotational position of the lens blank/lens mold assembly with respect to the lathe collet, in which case the rotational position of the lens blank/lens mold assembly can be controlled in combination with the position of the lathe cutting tool 72.

An advantage of this invention is that axial alignment of the hardened material 50 and the shaft portion 31 of the arbor article 60 is controlled, and the axial alignment of each lens mold 20 mounted on the arbor article 60 is controlled. A further advantage of this invention is that the arbor article may be used for lathe cutting multiple lens blanks retained in their respective individual lens molds, provided that the lens molds have similarly shaped and sized lower portions. Additionally, the lathe cutting of surface 42 is accomplished without the cumbersome blocking and deblocking steps employed in many prior contact lens lathe cutting operations.

The above-described preferred embodiments relate primarily to methods involving lathing a contact lens blank button having a cast convex, front curve. However, the invention is also applicable to methods involving a semi-finished contact lens blank having a cast concave, base curve, or for lathe cutting a surface in a cylindrical cast button. Additionally, the invention is applicable to lens molds other than the contact lens molds described with reference to the preferred embodiments, so long as a replica may be obtained of the lens mold for subsequent mounting of similar lens molds thereto on an arbor. Various other alternate embodiments and variations of the present invention will be evident to one skilled in the art.

What is claimed is:

1. A method comprising:
   providing a lens mold, said lens mold including a lens-forming molding surface and an opposed non-molding surface, and placing a liquid or pliable solid material between the opposed surface of the lens mold and an end of an arbor;
   moving the lens mold and the arbor towards one another while maintaining axial alignment therebetween, whereby said material is pressed between and contacts a surface of the lens mold and a surface of the arbor end and conforms to said surfaces;
   hardening said material to form a hardened replica of the lens mold surface contacted by said material; and
   separating the arbor with the hardened material attached thereto from the lens mold.

2. The method of claim 1, wherein a central axis of the lens mold is congruent with a central axis of the arbor when said material conforms to the lens mold and arbor end surfaces.

3. The method of claim 1, wherein the lens mold is secured in a first fixture to inhibit axial movement thereof, and the arbor is secured in a second fixture to inhibit axial movement thereof.

4. The method of claim 3, wherein the first and second fixtures include complementary tapered surfaces for maintaining axial alignment of the lens mold and arbor secured thereon.

5. The method of claim 4, where the second first fixture includes a bore for receiving the arbor, and said second fixture bore has an inner diameter closely approximately an outer diameter of the arbor.

6. The method of claim 4, wherein the first fixture includes a bore for receiving the lens mold, said lens mold including a sidewall depending from the opposed surface, and said first fixture bore has an inner diameter closely approximately an outer diameter of the lens mold sidewall.

7. The method of claim 1, wherein the lens mold includes a sidewall depending from the opposed surface, and wherein said material contacts an inner surface of the sidewall, and wherein the arbor end is received in a space surrounded by the sidewall.

8. The method of claim 7, wherein at least a portion the inner surface of the sidewall that contacts said material is noncylindrical.

9. The method of claim 8, wherein the sidewall is a generally cylindrical shell, the inner surface of which includes facets formed at a distal end of the shell.

10. The method of claim 1, wherein the arbor comprises a generally cylindrical body with a longitudinal groove formed in an outer surface thereof.

11. The method of claim 1, further comprising placing the arbor on a lathe collet, securing a second contact lens mold including a lens blank cast therein to the hardened material of the arbor, and lathe cutting a desired lens surface in the lens blank.

12. The method of claim 11, further comprising using the hardened material of the arbor to lathe cut a desired lens surface in multiple lens blanks retained in respective lens molds.

* * * * *